(12) United States Patent
Zhang et al.

(10) Patent No.: US 11,695,322 B2
(45) Date of Patent: Jul. 4, 2023

(54) AC-SIDE SYMMETRICALLY-SPLIT SINGLE-PHASE INVERTER FOR DECOUPLING

(71) Applicant: East China Jiaotong University, Jiangxi (CN)

(72) Inventors: Yonggao Zhang, Jiangxi Province (CN); Yue Fan, Jiangxi Province (CN); Peng Liu, Jiangxi Province (CN); Weidong Fu, Jiangxi Province (CN); Siyuan Ze, Jiangxi Province (CN); Chengkai Chai, Jiangxi Province (CN)

(73) Assignee: East China Jiaotong University, Jiangxi (CN)

( * ) Notice: Subject to any disclaimer, the term of this patent is extended or adjusted under 35 U.S.C. 154(b) by 38 days.

(21) Appl. No.: 17/454,146

(22) Filed: Nov. 9, 2021

(65) Prior Publication Data
US 2022/0149716 A1    May 12, 2022

(30) Foreign Application Priority Data
Nov. 10, 2020 (CN) .......................... 202011243982.9

(51) Int. Cl.
| | | |
|---|---|---|
| H02M 7/537 | (2006.01) | |
| H02M 7/5387 | (2007.01) | |
| H02M 1/14 | (2006.01) | |
| H02M 7/53 | (2006.01) | |

(52) U.S. Cl.
CPC ............. *H02M 1/14* (2013.01); *H02M 7/537* (2013.01); *H02M 7/53* (2013.01); *H02M 7/5387* (2013.01)

(58) Field of Classification Search
CPC .... H02M 7/48; H02M 7/4807; H02M 7/4826; H02M 7/483; H02M 7/4833; H02M 7/4837; H02M 7/493; H02M 7/53; H02M 7/537; H02M 7/5387
See application file for complete search history.

(56) References Cited

U.S. PATENT DOCUMENTS

2013/0314958 A1* 11/2013 Kern ....................... H02J 3/381
                                                            363/80

FOREIGN PATENT DOCUMENTS

| CN | 103916040 A | * | 7/2014 | |
| FR | 2584546 A | * | 1/1987 | .......... H02M 7/5387 |

* cited by examiner

*Primary Examiner* — Gary A Nash
(74) *Attorney, Agent, or Firm* — Greenberg Traurig, LLP

(57) ABSTRACT

An alternating current (AC)-side symmetrically-split single-phase inverter for decoupling, which includes an H-bridge inverter, the H-bridge inverter includes an upper half-bridge structure and a lower half-bridge structure that are symmetrical to each other, the upper half-bridge structure includes an upper half-bridge first unit and an upper half-bridge second unit in parallel, the upper half-bridge first unit includes an insulated-gate bipolar transistor G1, a diode D1, and a capacitor C3 in parallel, the upper half-bridge second unit includes an insulated-gate bipolar transistor G3, a diode D3, and a capacitor C4 in parallel; and the lower half-bridge structure includes a lower half-bridge first unit and a lower half-bridge second unit in parallel, the lower half-bridge first unit includes an insulated-gate bipolar transistor G2, a diode D2, and a capacitor C1 in parallel, the lower half-bridge second unit includes an insulated-gate bipolar transistor G4, a diode D4, and a capacitor C2 in parallel.

6 Claims, 4 Drawing Sheets

… (1)

AC-SIDE SYMMETRICALLY-SPLIT SINGLE-PHASE INVERTER FOR DECOUPLING

CROSS REFERENCE TO RELATED APPLICATION(S)

This patent application claims the benefit and priority of Chinese Patent Application No. 202011243982.9, filed on Nov. 10, 2020, the disclosure of which is incorporated by reference herein in its entirety as part of the present application.

TECHNICAL FIELD

The present disclosure relates to the field of structure design of single-phase inverters, in particular to, an alternating current (AC)-side symmetrically-split single-phase inverter for decoupling.

BACKGROUND ART

Single-phase inverters are widely used in residential and industrial power supplies. However, double-frequency ripples on the direct current (DC) side are introduced in the process of power conversion between the DC side and the AC side, affecting the efficiency of the DC side power supply. In this case, many power decoupling techniques have been proposed. For example, a method for buffering double-frequency power is to simply connect large electrolytic capacitors in parallel on the DC side. However, service life of the single-phase inverters is affected due to the relatively short life of the large electrolytic capacitors. To buffer the double-frequency power in the system, many scholars have proposed active decoupling methods. Some have proposed to connect power decoupling circuits in parallel on the DC side. In the document "An Active Low-Frequency Ripple Control Method Based on the Virtual Capacitor Concept for BIPV Systems", the virtual capacitor concept is proposed, and a current integrator is introduced in the control strategy to replace unit feedback and promptly compensate the secondary ripple in the system. Furthermore, in the document "A Power Decoupling Circuit in Micro-Inverters Based on Buck/Boost Circuits", a power decoupling circuit connected in parallel on the AC side is proposed, and four operation modes of decoupling topology are constructed to compensate the double-frequency power. In addition, in some other solutions, algorithms and intermediate bus capacitors are used to decouple the DC link of the two-level inverter.

The secondary ripple may be suppressed by using all the foregoing solutions, but additional switching devices are required to construct a power decoupling circuit. As a result, the costs and loss of the entire system increase, and the complete decoupling cannot be achieved.

SUMMARY

An objective of the present disclosure is to provide an AC-side symmetrically-split single-phase inverter for decoupling, to decrease costs and loss and achieve complete decoupling.

To implement the above objective, the present disclosure provides the following solutions:

An AC-side symmetrically-split single-phase inverter for decoupling includes an H-bridge inverter, where the H-bridge inverter includes an upper half-bridge structure and a lower half-bridge structure that are symmetrical to each other, the upper half-bridge structure includes an upper half-bridge first unit and an upper half-bridge second unit in parallel, the upper half-bridge first unit includes an insulated-gate bipolar transistor G1, a diode D1, and a capacitor C3 in parallel, and the upper half-bridge second unit includes an insulated-gate bipolar transistor G3, a diode D3, and a capacitor C4 in parallel; and the lower half-bridge structure includes a lower half-bridge first unit and a lower half-bridge second unit in parallel, the lower half-bridge first unit includes an insulated-gate bipolar transistor G2, a diode D2, and a capacitor C1 in parallel, the lower half-bridge second unit includes an insulated-gate bipolar transistor G4, a diode D4, and a capacitor C2 in parallel, an inductor L1 is disposed between the upper half-bridge first unit and the lower half-bridge first unit, and an inductor L2 is disposed between the upper half-bridge second unit and the lower half-bridge second unit.

Optionally, the diode D1 is connected in parallel between a collector and an emitter of the insulated-gate bipolar transistor G1, the diode D2 is connected in parallel between a collector and an emitter of the insulated-gate bipolar transistor G2, the diode D3 is connected in parallel between a collector and an emitter of the insulated-gate bipolar transistor G3, and the diode D4 is connected in parallel between a collector and an emitter of the insulated-gate bipolar transistor G4.

Optionally, a collector of the insulated-gate bipolar transistor G1, a negative electrode of the diode D1, and a positive electrode of the capacitor C3 are connected to a positive terminal of a power supply, a collector of the insulated-gate bipolar transistor G3, a negative electrode of the diode D3, and a positive electrode of the capacitor C4 are connected to the positive terminal of the power supply, an emitter of the insulated-gate bipolar transistor G2, a positive electrode of the diode D2, and a negative electrode of the capacitor C1 are connected to a negative terminal of the power supply, and an emitter of the insulated-gate bipolar transistor G4, a positive electrode of the diode D4, and a negative electrode of the capacitor C2 are connected to the negative terminal of the power supply.

Optionally, the inductor L1 and the inductor L2 are AC side filter inductors.

Optionally, the capacitor C1, the capacitor C2, the capacitor C3, and the capacitor C4 are original symmetrically-split filter capacitors on the AC side, and the capacitor C1, the capacitor C2, the capacitor C3, and the capacitor C4 are used to buffer double-frequency power of a system.

Optionally, the AC-side symmetrically-split single-phase inverter for decoupling further includes a resistor, where the resistor is located among the upper half-bridge first unit, the upper half-bridge second unit, the lower half-bridge first unit, and the lower half-bridge second unit.

Based on specific embodiments provided in the present disclosure, the present disclosure discloses the following technical effects:

In the present disclosure, only original filter split capacitors on AC side are used to compensate the double-frequency power without additional switching devices, thus removing electrolytic capacitors and achieving complete decoupling. In the present disclosure, the decoupling process can be completed only on the AC side without the original supporting capacitor on the DC side, to shorten a buffer loop of double-frequency power, so that the entire topology has a simple structure, and the algorithm control is simple.

BRIEF DESCRIPTION OF THE DRAWINGS

To describe the technical solutions in the embodiments of the present disclosure or in the prior art more clearly, the accompanying drawings required for the examples are briefly described below. Apparently, the accompanying drawings in the following description show merely some examples of the present disclosure, and a person of ordinary skill in the art may still derive other accompanying drawings from these accompanying drawings without creative efforts.

DETAILED DESCRIPTION OF THE EMBODIMENTS

The technical solutions of the embodiments of the present disclosure are clearly and completely described below with reference to the accompanying drawings. Apparently, the described embodiments are merely a part rather than all of the embodiments of the present disclosure. All other embodiments obtained by a person of ordinary skill in the art on the basis of the embodiments of the present disclosure without creative efforts shall fall within the protection scope of the present disclosure.

One objective of the present disclosure is to provide an AC-side symmetrically-split single-phase inverter for decoupling, to decrease costs and loss and achieve complete decoupling.

To make the above objectives, features, and advantages of the present disclosure clearer and more comprehensible, the present disclosure will be further described in detail below with reference to the accompanying drawings and the specific examples.

Figure 1:
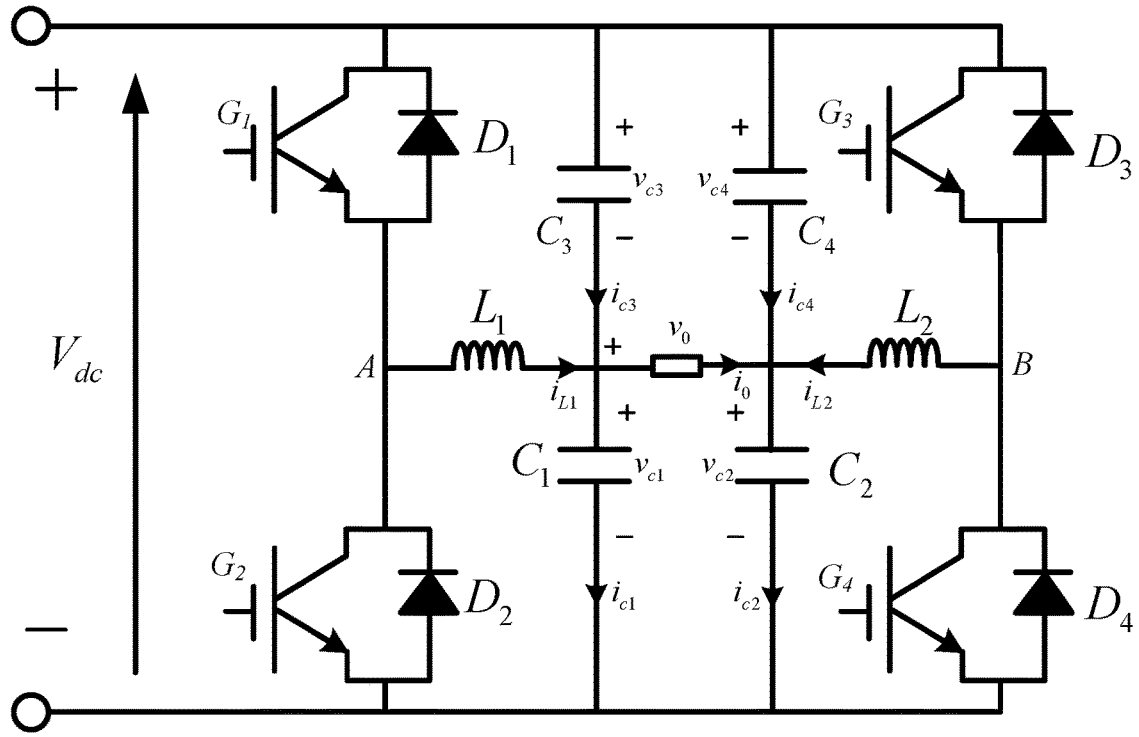
FIG. 1 is a schematic diagram of a circuit of an AC-side symmetrically-split single-phase inverter for decoupling.

FIG. 1 is a schematic diagram of a circuit of an AC-side symmetrically-split single-phase inverter for decoupling. As shown in FIG. 1, the AC-side symmetrically-split single-phase inverter for decoupling includes an H-bridge inverter, where the H-bridge inverter includes an upper half-bridge structure and a lower half-bridge structure that are symmetrical to each other, the upper half-bridge structure includes an upper half-bridge first unit and an upper half-bridge second unit in parallel, the upper half-bridge first unit includes an insulated-gate bipolar transistor G1, a diode D1, and a capacitor C3 in parallel, and the upper half-bridge second unit includes an insulated-gate bipolar transistor G3, a diode D3, and a capacitor C4 in parallel; and the lower half-bridge structure includes a lower half-bridge first unit and a lower half-bridge second unit in parallel, the lower half-bridge first unit includes an insulated-gate bipolar transistor G2, a diode D2, and a capacitor C1 in parallel, the lower half-bridge second unit includes an insulated-gate bipolar transistor G4, a diode D4, and a capacitor C2 in parallel, an inductor L1 is disposed between the upper half-bridge first unit and the lower half-bridge first unit, and an inductor L2 is disposed between the upper half-bridge second unit and the lower half-bridge second unit.

The diode D1 is connected in parallel between a collector and an emitter of the insulated-gate bipolar transistor G1, the diode D2 is connected in parallel between a collector and an emitter of the insulated-gate bipolar transistor G2, the diode D3 is connected in parallel between a collector and an emitter of the insulated-gate bipolar transistor G3, and the diode D4 is connected in parallel between a collector and an emitter of the insulated-gate bipolar transistor G4.

A collector of the insulated-gate bipolar transistor G1, a negative electrode of the diode D1, and a positive electrode of the capacitor C3 are connected to a positive terminal of a power supply, a collector of the insulated-gate bipolar transistor G3, a negative electrode of the diode D3, and a positive electrode of the capacitor C4 are connected to the positive terminal of the power supply, an emitter of the insulated-gate bipolar transistor G2, a positive electrode of the diode D2, and a negative electrode of the capacitor C1 are connected to a negative terminal of the power supply, and an emitter of the insulated-gate bipolar transistor G4, a positive electrode of the diode D4, and a negative electrode of the capacitor C2 are connected to the negative terminal of the power supply.

The inductor L1 and the inductor L2 are AC side filter inductors. The capacitor C1, the capacitor C2, the capacitor C3, and the capacitor C4 are original symmetrically-split filter capacitors on the AC side, and the capacitor C1, the capacitor C2, the capacitor C3, and the capacitor C4 are used to buffer double-frequency power of a system. The common-mode component of the fundamental frequency in the decoupling capacitor is controlled to accurately compensate the double-frequency power in the system.

The AC-side symmetrically-split single-phase inverter for decoupling further includes a resistor, where the resistor is located among the upper half-bridge first unit, the upper half-bridge second unit, the lower half-bridge first unit, and the lower half-bridge second unit.

As shown in FIG. 1, the main circuit is a single-phase H-bridge inverter. It is assumed that the output voltage and output current are:

$$v_0 = V_0 \sin \omega t \quad (1) \text{ and}$$

$$i_0 = I_0 \sin \omega t \quad (2); \text{ and}$$

the AC side output power is:

$$P_{ac} = v_0 i_0 = \frac{V_0 I_0}{2} - \frac{V_0 I_0}{2} \cos \omega t, \quad (3)$$

where there is double-frequency power on the AC output side. If it is not controlled through decoupling, secondary ripples appear on the DC side. Therefore, two sets of symmetrically-split filter capacitors on the AC side are injected with a common-mode voltage, thereby compensating the double-frequency power in the system, to remove electrolytic capacitor and ensure the output voltage remains unchanged.

Before the interjection of the common-mode voltage, voltages of the capacitors C1, C2, C3, and C4 are:

$$V_{c1} = \frac{V_{dc}}{2} + \frac{v_0}{2} \quad (4)$$

-continued $$V_{c2} = \frac{V_{dc}}{2} - \frac{v_0}{2} \quad (5)$$

$$V_{c3} = \frac{V_{dc}}{2} - \frac{v_0}{2} \text{ and} \quad (6)$$

$$V_{c4} = \frac{V_{dc}}{2} + \frac{v_0}{2}, \quad (7)$$

where $V_{dc}$ is a DC side input voltage.

After the interjection of the common-mode voltage $V_{com}$, the voltages of the four capacitors are:

$$V_{c1} = \frac{V_{dc}}{2} + \frac{v_0}{2} + V_{con} \quad (8)$$

$$V_{c2} = \frac{V_{dc}}{2} - \frac{v_0}{2} + V_{con} \quad (9)$$

$$V_{c3} = \frac{V_{dc}}{2} - \frac{v_0}{2} - V_{con} \text{ and} \quad (10)$$

$$V_{c4} = \frac{V_{dc}}{2} + \frac{v_0}{2} - V_{con}, \quad (11)$$

where the common-mode voltage is obtained as:

$$V_{com} = A \sin(\omega t + \beta) \quad (12).$$

According to formulas (8-11), a sum of reactive powers of the two sets of symmetrically-split filter capacitors may be obtained as:

$$P_{c1} + P_{c2} + P_{c3} + P_{c4} = \frac{\omega C V_g^2}{2} \sin 2\omega t + 2A^2 C \omega \sin(2\omega t + \beta), \quad (13)$$

where $P_{c1}$ is a reactive power of the capacitor C1, $P_{c2}$ is a reactive power of the capacitor C2, $P_{c3}$ is a reactive power of the capacitor C3, and $P_{c4}$ is a reactive power of the capacitor C4.

Based on the double-frequency power on the AC output side, as shown in formula (3), to make the double-frequency instantaneous power in the entire system zero, the reactive power on the capacitor needs to be decoupled to exactly compensate the reactive power output on the AC side, which is completed by using the following formula:

$$\frac{\omega C_0^2}{2} \sin 2\omega t + 2A^2 C \omega \sin(2\omega t + \beta) - \frac{V_0 i_0}{2} \cos 2\omega t = 0. \quad (14)$$

Complete decoupling may be achieved by changing the initial phase and amplitude of the common-mode voltage, where $$A = \frac{1}{\sqrt{2C\omega}} \left( \frac{V_0^2 I_0^2}{4} + \frac{C^2 \omega^2 V_0^4}{4} \right)^{\frac{1}{4}} \text{ and} \quad (15)$$

$$\theta = \frac{\pi}{2} - \frac{1}{2} \arcsin \left( \frac{V_0 I_0}{2\sqrt{\frac{V_0^2 I_0^2}{4} + \frac{C^2 \omega^2 V_0^4}{4}}} \right). \quad (16)$$

Because the voltages of capacitors C1 and C3 on the DC power supply side meet the KVL relationship, when inductor voltages are ignored, the capacitor voltage and the DC input voltage meet the following relationship:

$$V_{dc} = V_{c1} + V_{c3} = V_{c2} + V_{c4} \quad (17).$$

Therefore, the capacitor bank on the left, during the decoupling, only needs to control the voltage of the decoupling capacitor C1 or C3, and control the voltage of the decoupling capacitor C2 or C4 similarly. In this case, the voltages of capacitors C1 and C2 are selected as the control objects. Moreover, a classic method for controlling voltage-current double loops is used. The outer loop is the decoupling capacitor voltage, and the inner loop is the decoupling inductor current. The entire control block diagram is shown in FIG. 2.

Figure 2:
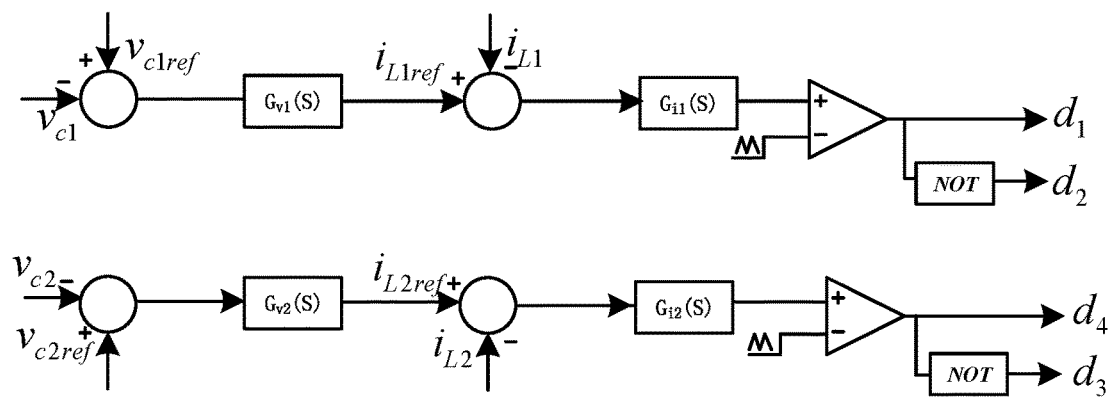
FIG. 2 is a schematic diagram of a control system of the AC-side symmetrically-split single-phase inverter for decoupling.

The voltage form $V_{c1ref}$ in FIG. 2 can be obtained according to formulas (8, 15, and 16). An error signal is obtained based on the difference between the sample voltage of the decoupling capacitor C1 and $v_{c1ref}$. An inductor current reference value is obtained based on the error signal by using a voltage controller GV1(S). Then, a current error signal is obtained based on the difference between the inductor current reference value and an inductor current sample value. A duty cycle signal is obtained based on the error signal by using a current controller Gi1. $d_1$ and $d_2$ in FIG. 2 respectively correspond to a duty cycle signal of a switch tube G1 and that of G2 in FIG. 1.

Similarly, the duty cycle signals $d_3$ and $d_4$ generated in the lower part of the control block diagram respectively correspond to G3 and G4 in FIG. 1. $v_{c2ref}$ may be obtained by using formulas (9, 15, and 16). An error signal is obtained based on the difference between a sample voltage of the capacitor C2 and $v_{c2ref}$. A current reference value of the inductor L2 is obtained by using the voltage controller Gv2(S). Then, an error signal is obtained based on the difference between a sample current value of the inductor L2 and $i_{L2ref}$. A modulation wave of a right arm in FIG. 1 is obtained based on the error signal by using a current controller Gi2(S), and then the modulation wave is compared with a triangular carrier wave to get duty cycle signals.

Simulation verification is performed on the simulation software MATLAB based on the follow setting. The DC-side input voltage is set to 450 V. The decoupling capacitor parameter is set to 60 uF. The decoupling inductance is set to 1 mH. The load is set to 200 Ohms. The rated power is set to 115 W.

Figure 3:
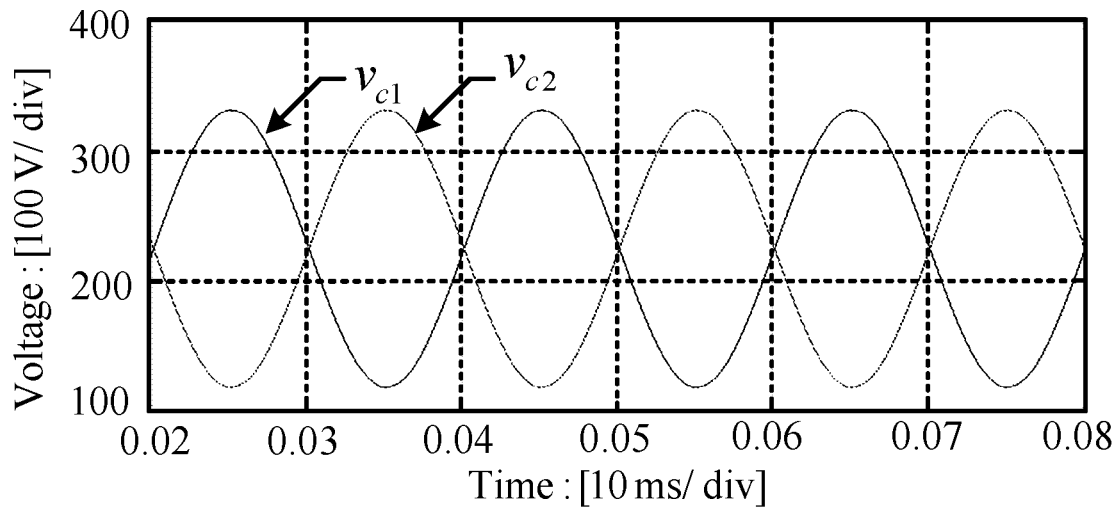
FIG. 3 is a schematic diagram of voltage waveforms of capacitors C1 and C2 before decoupling.
Figure 4:
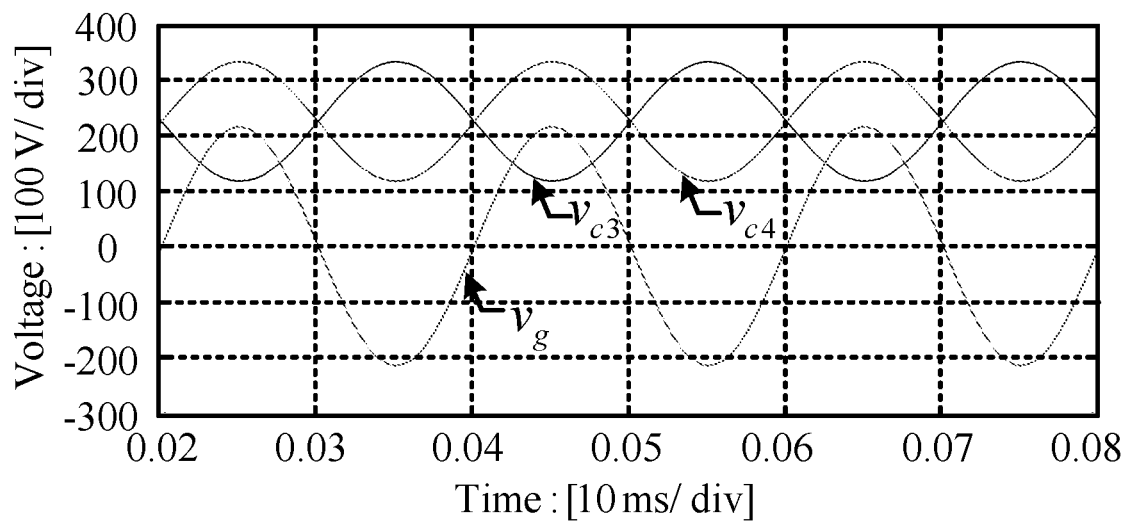
FIG. 4 is a schematic diagram of voltage waveforms of capacitors C3 and C4 before decoupling.
Figure 5:
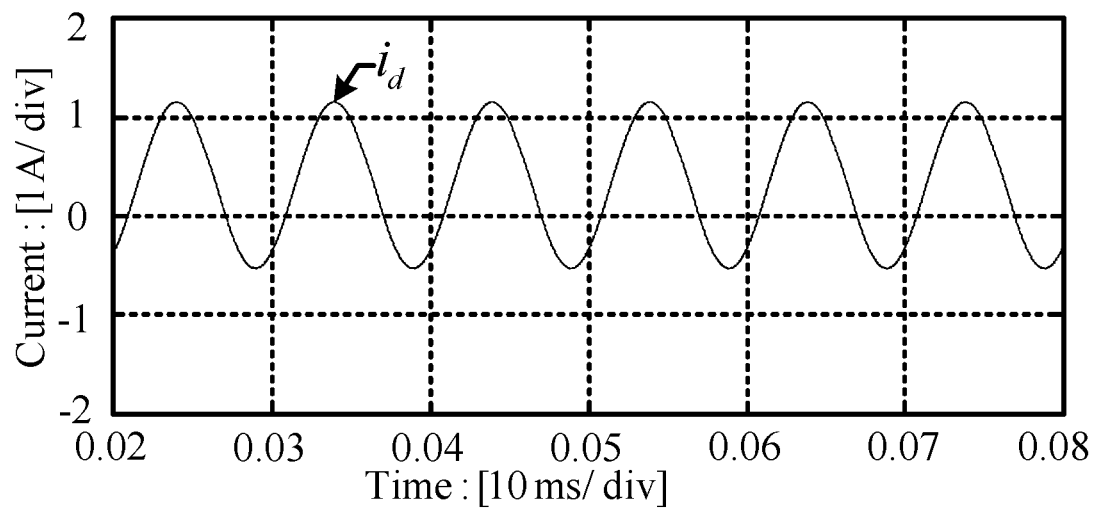
FIG. 5 is a schematic diagram of a current waveform on the DC side after decoupling.

FIG. 3 and FIG. 4 show the capacitor voltage and output voltage waveforms before decoupling. The decoupling capacitor voltage has a DC bias of 225 V. The voltage ripple is 107.5 V. The maximum and minimum capacitor voltages are 332.5 V and 117.5 V respectively. As shown in the formulas (1-4), voltages of decoupling capacitors C1 and C2 in the same group, and these of decoupling capacitors C3 and C4 in the same group are 180 degrees out of phase. The output voltage is a sine wave with an amplitude of 215 V. The DC side current waveform before decoupling is shown in FIG. 5 in which the frequency of the waveform is 100 Hz, the maximum value of the DC side current is 1.16 A, and the minimum value is −0.55 A.

Figure 6:
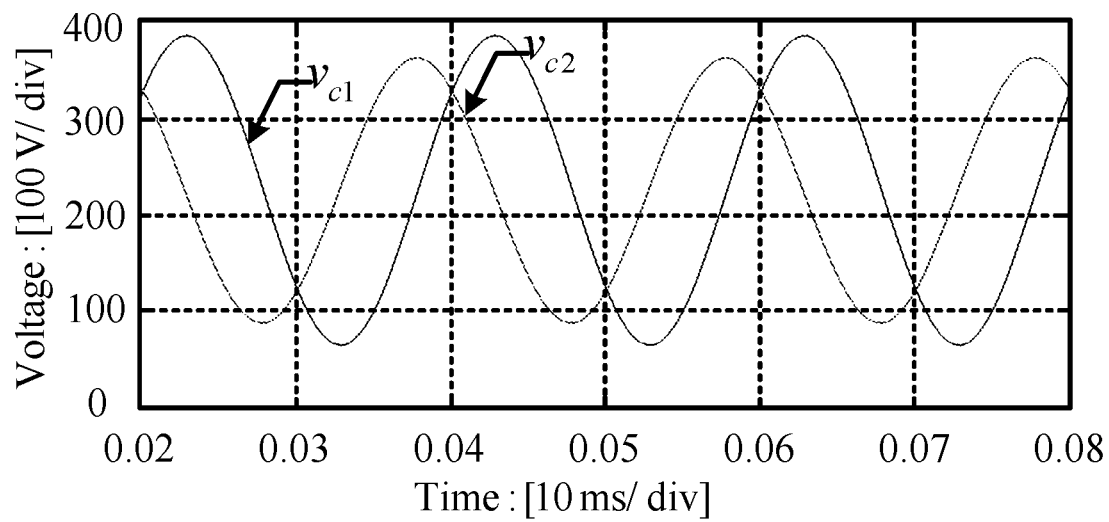
FIG. 6 is a schematic diagram of voltage waveforms of the capacitors C1 and C2 after decoupling.
Figure 7:
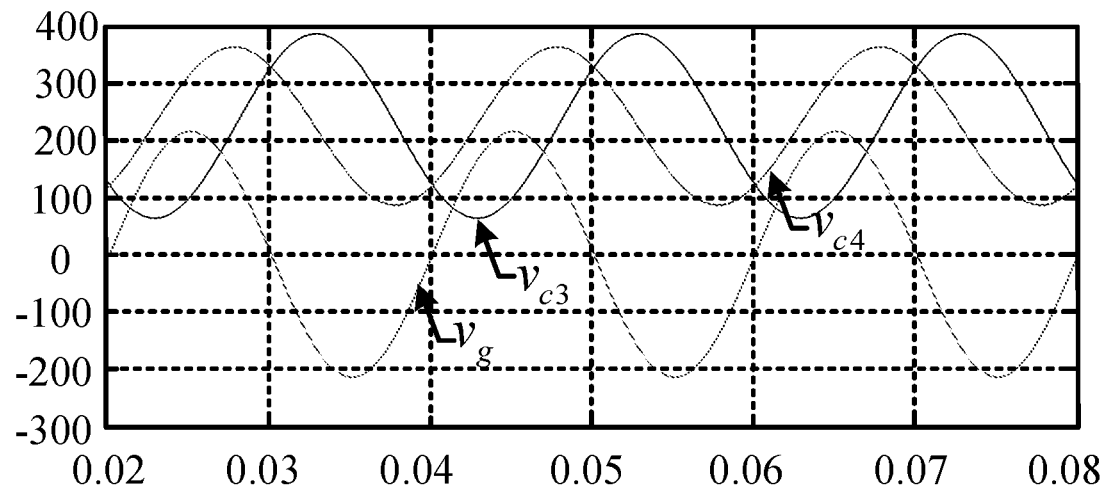
FIG. 7 is a schematic diagram of voltage waveforms of the capacitors C3 and C4 after decoupling.
Figure 8:
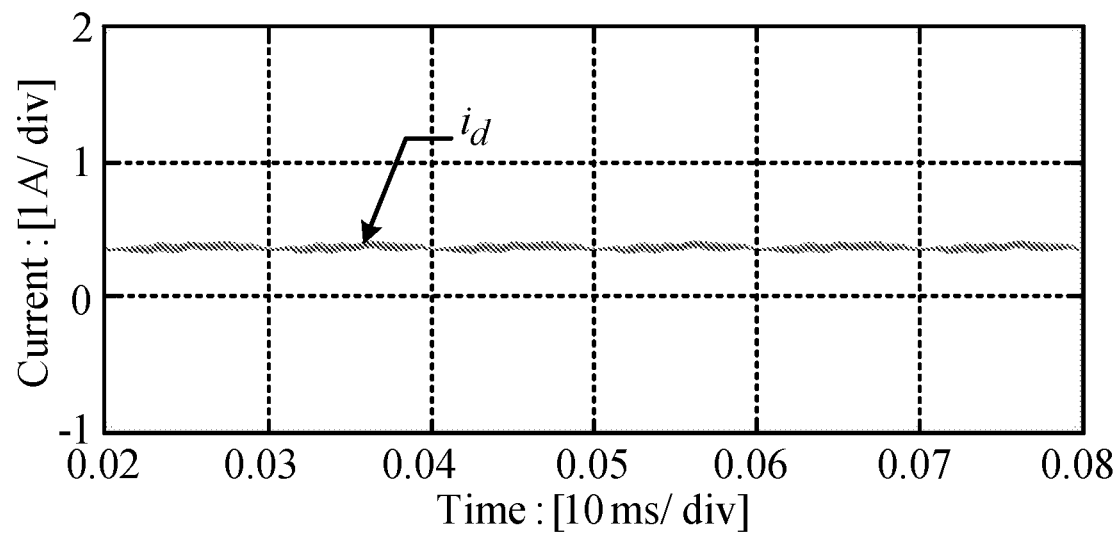
FIG. 8 is a schematic diagram of a current waveform on the DC side after decoupling.

FIG. 6 and FIG. 7 show the capacitor voltage and output voltage waveforms after decoupling. In the figures, the output voltage is the same before and after decoupling. The amplitude of the decoupling capacitor voltage increases after decoupling due to the interjection of the common-mode voltage. In this case, the maximum and minimum voltages of the decoupling capacitor C1 are 388 V and 61 V respectively, the maximum and minimum voltages of the decoupling capacitor C2 are 369 V and 80 V respectively, the maximum and minimum voltages of the decoupling capacitor C3 are 388 V and 62 V respectively, and the maximum and minimum values of the decoupling capacitor C4 are 370 V and 81 V respectively. After decoupling, the secondary ripple of the DC side current is completely decoupled. In this case, only a DC bias of 0.35 A is left. FIG. 8 is a schematic diagram of a current waveform on the DC side after decoupling.

Each example of the present specification is described in a progressive manner, each example focuses on the difference from other examples, and the same and similar parts between the examples may refer to each other.

Several examples are used for illustration of the principles and implementation methods of the present disclosure. The description of the examples is used to help illustrate the apparatus and its core concept in the present disclosure. In addition, those of ordinary skill in the art can make various modifications in terms of specific implementation methods and scope of application in accordance with the concept of the present disclosure. In conclusion, the content of this specification shall not be construed as a limitation to the present disclosure.

What is claimed is:

1. An alternating current (AC)-side symmetrically-split single-phase inverter for decoupling, comprising an H-bridge inverter and a resistor, wherein the H-bridge inverter comprises an upper half-bridge structure and a lower half-bridge structure that are symmetrical to each other and serially connected, the upper half-bridge structure comprises an upper half-bridge first unit and an upper half-bridge second unit coupled in parallel, the upper half-bridge first unit comprises an insulated-gate bipolar transistor G1, a diode D1, and a capacitor C3 coupled in parallel, and the upper half-bridge second unit comprises an insulated-gate bipolar transistor G3, a diode D3, and a capacitor C4 coupled in parallel; and the lower half-bridge structure comprises a lower half-bridge first unit and a lower half-bridge second unit coupled in parallel, the lower half-bridge first unit comprises an insulated-gate bipolar transistor G2, a diode D2, and a capacitor C1 coupled in parallel, the lower half-bridge second unit comprises an insulated-gate bipolar transistor G4, a diode D4, and a capacitor C2 in parallel, an inductor L1 is shared by the upper half-bridge first unit and the lower half-bridge first unit, and an inductor L2 is shared by the upper half-bridge second unit and the lower half-bridge second unit; and wherein the resistor is connected between the upper half-bridge first unit and the upper half-bridge second unit, and the resistor is also connected between the lower half-bridge first unit and the lower half-bridge second unit.

2. The AC-side symmetrically-split single-phase inverter for decoupling according to claim 1, wherein the diode D1 is connected in parallel between a collector and an emitter of the insulated-gate bipolar transistor G1, the diode D2 is connected in parallel between a collector and an emitter of the insulated-gate bipolar transistor G2, the diode D3 is connected in parallel between a collector and an emitter of the insulated-gate bipolar transistor G3, and the diode D4 is connected in parallel between a collector and an emitter of the insulated-gate bipolar transistor G4.

3. The AC-side symmetrically-split single-phase inverter for decoupling according to claim 2, wherein the inductor L1 is connected between the diode D1 and the capacitor C3, and the inductor L1 is also connected between the diode D2 and the capacitor C1; and wherein the inductor L2 is connected between the diode D3 and the capacitor C4, and the inductor L2 is also connected between the diode 4 and the capacitor C2.

4. The AC-side symmetrically-split single-phase inverter for decoupling according to claim 1, wherein a collector of the insulated-gate bipolar transistor G1, a negative electrode of the diode D1, and a positive electrode of the capacitor C3 are connected to a positive terminal of a power supply, a collector of the insulated-gate bipolar transistor G3, a negative electrode of the diode D3, and a positive electrode of the capacitor C4 are connected to the positive terminal of the power supply, an emitter of the insulated-gate bipolar transistor G2, a positive electrode of the diode D2, and a negative electrode of the capacitor C1 are connected to a negative terminal of the power supply, and an emitter of the insulated-gate bipolar transistor G4, a positive electrode of the diode D4, and a negative electrode of the capacitor C2 are connected to the negative terminal of the power supply.

5. The AC-side symmetrically-split single-phase inverter for decoupling according to claim 1, wherein the inductor L1 and the inductor L2 are AC side filter inductors.

6. The AC-side symmetrically-split single-phase inverter for decoupling according to claim 1, wherein the capacitor C1, the capacitor C2, the capacitor C3, and the capacitor C4 are original symmetrically-split filter capacitors on the AC side, and the capacitor C1, the capacitor C2, the capacitor C3, and the capacitor C4 are used to buffer double-frequency power of a system.

* * * * *